Dec. 29, 1931.  F. W. MEYER  1,838,700
PORTABLE MOTOR
Filed June 15, 1928   3 Sheets-Sheet 1

Inventor:
Friedrich Wilhelm Meyer
by George C. Heinritz
Attorney.

Dec. 29, 1931.  F. W. MEYER  1,838,700
PORTABLE MOTOR
Filed June 15, 1928   3 Sheets-Sheet 3

Inventor:
Friedrich Wilhelm Meyer
by George C. Heimig
Attorney.

Patented Dec. 29, 1931

1,838,700

UNITED STATES PATENT OFFICE

FRIEDRICH WILHELM MEYER, OF VIENNA, AUSTRIA, ASSIGNOR TO URAL MASCHINEN VERTRIEBSGESELLSCHAFT M. B. H., OF VIENNA, AUSTRIA

PORTABLE MOTOR

Application filed June 15, 1928, Serial No. 285,535, and in Germany September 17, 1927.

This invention relates to improvements in motors for driving auxiliary engines, as for instance tree saws or the like, and it is the principal object of my invention to provide a portable motor with a clutch to connect and disconnect the motor with or from a driven engine.

Another object of my invention is the provision of handles for the portable motor one of which has the form of a roller equipped with a finger adapted to operate as a clutch operating member.

A further object of my invention is the provision of a portable motor the roller handle of which is connected by means of a system of rods with the throttle controlling the gas valve.

A still further object of my invention is the provision of a friction clutch, the conical members of which are normally held engaged by means of a spring while they may be separated by the operation of a system of levers including an adjustable set screw in the path of the finger on the handle roller.

These and other objects of my invention and advantages thereof will become more fully known as the description thereof proceeds and will then be specifically defined in the appended claims.

In the accompanying drawings forming a material part of this disclosure:

Figure 1:
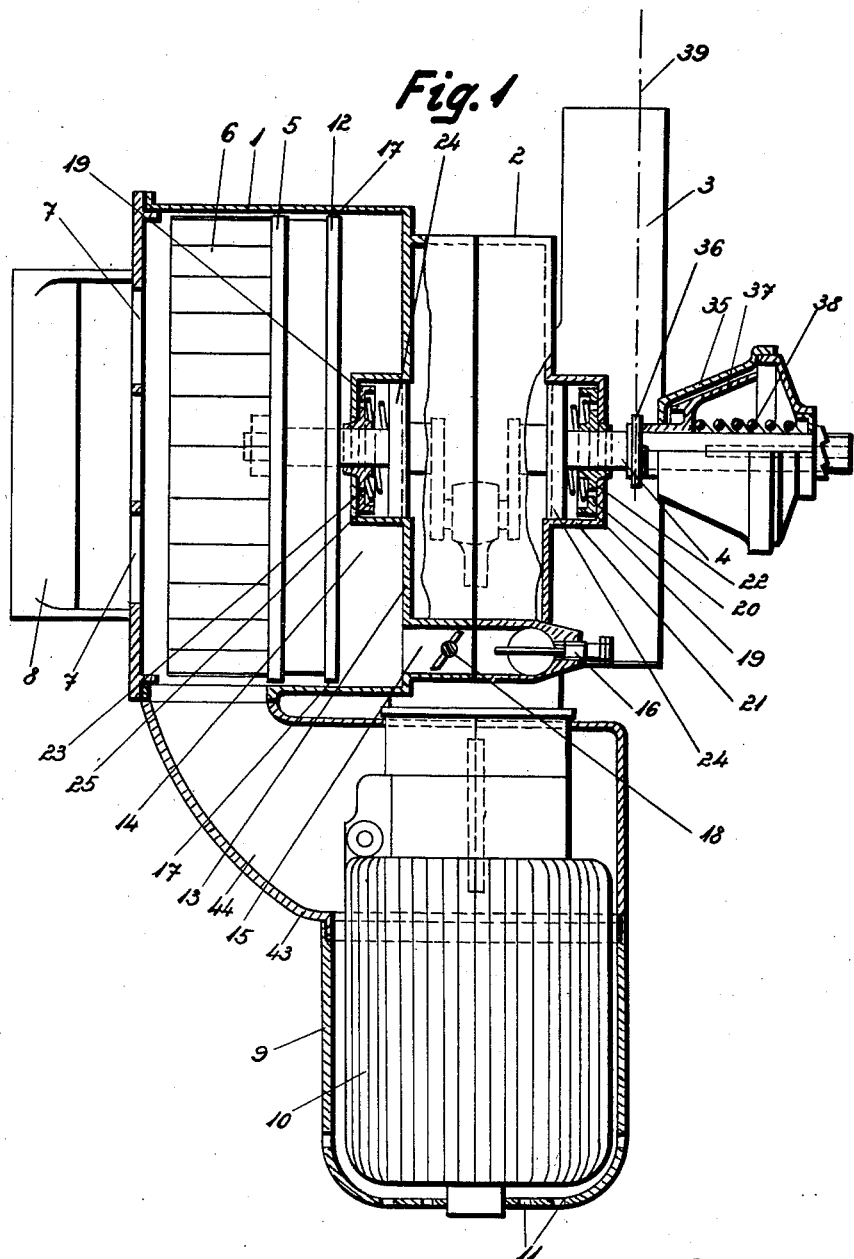
Fig. 1 is a top plan view of the portable motor and clutch constructed according to my invention, partly in section with the cover removed.
Figure 2:
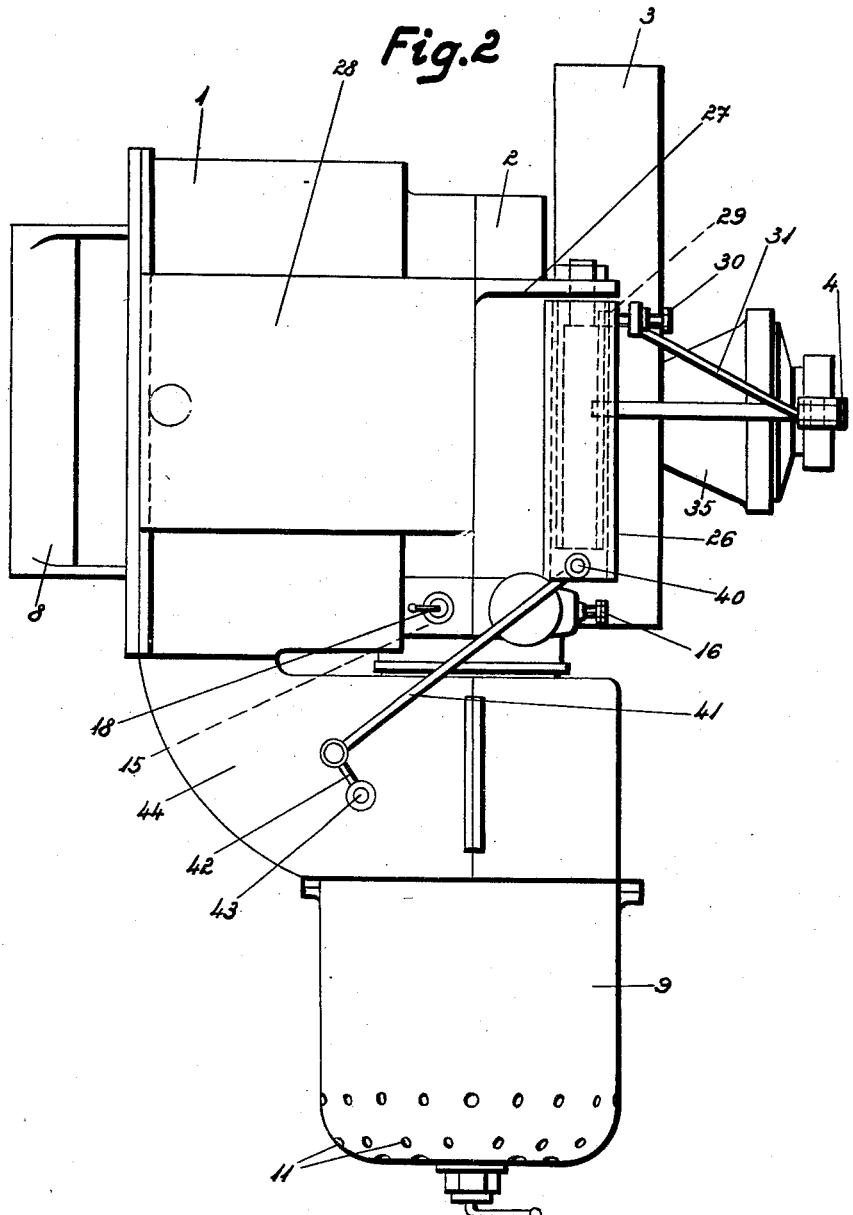
Fig. 2 is a view similar to Figure 1 with the cover in place.
Figure 3:
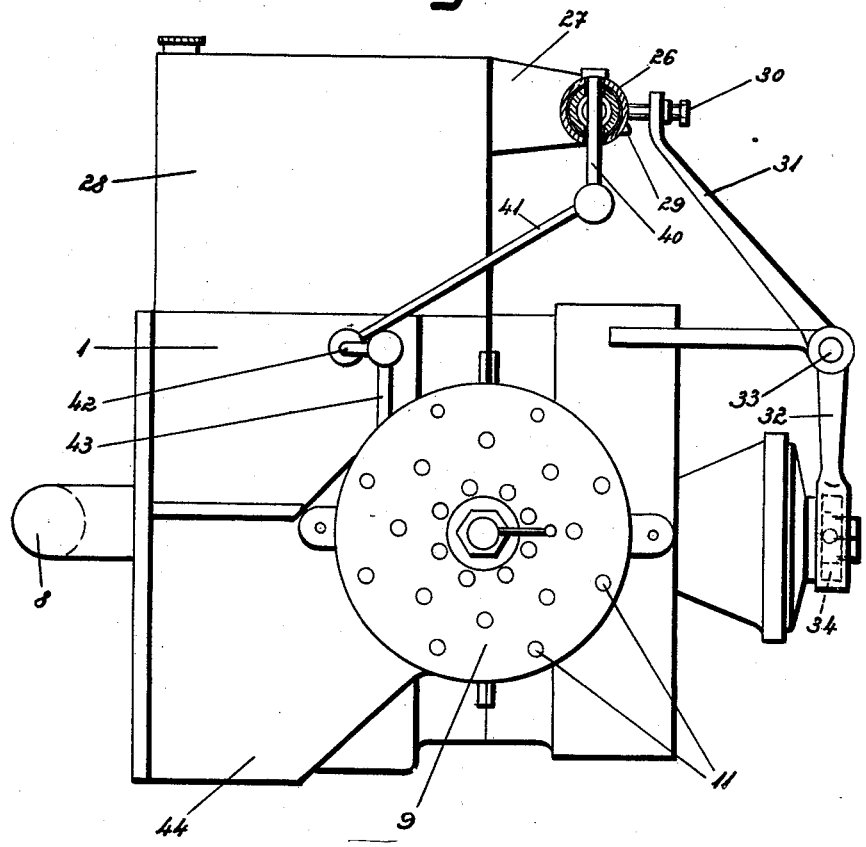
Fig. 3 is an end elevation of the motor and clutch.
Figure 4:
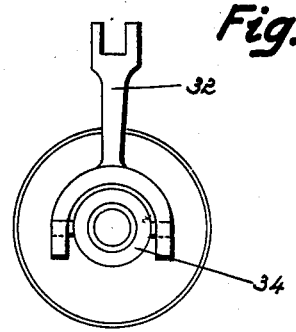
Fig. 4 is a detail view of a clutch operating lever.

In the casing 1 attached to the crank casing 2 on the engine frame 3, a fan 6 is connected to the crank shaft 4 and attached to the revolving magnet 5 so that the air flowing through the inlet openings 7, 8, in casing 1 has to pass through the air pipe 44 into the casing 9 of the motor. In this casing are provided holes so that the air which becomes compressed to a certain degree in the air pipe keeps the dust or other impurities from the cylinder. As the magnet 5 is arranged behind a fan 6 that is to say between it and the crank casing, an unobstructed path for the air is provided from the inlet openings 7 to the outlet openings 11, which enables a large quantity of air to be supplied to the cylinder 10. The armature frame 12 of the ignition magnet 5 which is rigidly mounted on the casing but does not close it hermetically forms a wall which forms with the partition 13 an air space or chamber 14, connected by the passage or port 15 with the carburetor 16. The carburetor is closed externally and is compelled to take its air from this space or chamber 14, so that it always receives pure air. The narrow space 17 between the armature frame 12 and the walls of the casing 1 will act in this case as a channel to supply air to the space or chamber 14 under a certain pressure and supply the same to the carburetor, the regulation of this supply can be effected by a valve 18.

To form a perfect closure between this space or chamber 14 against the atmosphere and the crank casing, packing rings 19 are affixed to the crank shaft 4 which rings engage the walls 20 of the bushings 21 with their disc-like surfaces 22 provided with holes 23 and held against these walls by springs 25, which bear against the crank bearings 24. Packing is effected by a film of oil which forms between the contiguous surfaces of the walls 20 and the discs 22, the oil passing through the holes 23.

The regulation of the gas supply to the cylinder and therefore the control of the motor, also the coupling of the drive engine to the crank shaft 4 is effected by a roller 26 which with handle 8 on casing 1 allows a carrying of the motor by hand and this handle 26 is adapted to rotate on its spindle, attached by means of the arm 27 to the tank 28. The handle carries a finger 29, which, when the handle rotates, engages the set screw 30 of the coupling bell crank lever composed of the arms 31, 32, and fulcrumed at 33. The lever 32 has a forked end embracing a bearing 34 and operates the outer conical member 35 of a friction clutch which rotates with its inner conical member on shaft 4 and to which is connected chain wheel 36, which slides on the shaft 4 but does not rotate therewith. The member 35 of the friction clutch is pressed by a spring 38 against the cone of the part 37 so as to normally couple the driven engine 39 with the crank shaft 4. The handle 26 is also so pivotally connected by a system of rods 40, 41, 42, to the throttle valve 43 of the motor so that rotation of the handle also produces rotation of the gas valve and regulates the supply of gas.

The device operates as follows:

If it is desired to transport the motor by means of handles, 8, 26, the workman turns handle 26 to bring its finger 29 into engagement with the set screw 30 to force lever arm 31 back, so that lever arm 32 forces clutch member 35 out of engagement with clutch member 37 to stop the rotation of chain wheel 36. Simultaneously the rod connections 41, 42, will operate the throttle to a desired degree to brake the motor.

It will be understood that I have described and shown the preferred form of my device only as one example of the many possible ways to practically construct the same, and that I may make such changes therein as come within the scope of the appended claims without departure from the spirit of my invention.

Having now particularly described and ascertained the nature of my said invention, and in what manner the same is to be performed, I declare that what I claim is:

1. A portable motor for driving auxiliary engines, including a means for coupling the motor with the driven engine, said means comprising a rotatable handle on said motor, a finger on said handle, a clutch, and a system of levers adapted to be engaged by said finger, for operating said clutch to couple the motor with the auxiliary engine.

2. A portable motor for driving auxiliary engines including a means for coupling the motor with the driven engine comprising a clutch, a rotary handle on said motor, a finger on said handle, a system of levers, a set screw on one of the levers of said system adapted to be engaged by said finger to operate one member of said clutch, a shaft carrying the other member of said clutch, and a means on said shaft connecting the motor with the auxiliary engine.

3. A portable motor for driving auxiliary engines including a throttle, and means for coupling the motor with the auxiliary engine and controlling said throttle, said means comprising a rotary handle, a finger thereon, a system of rods connecting said handle with said throttle, a clutch, and a system of levers adapted to be operated by said finger for operating said clutch to couple the motor with the auxiliary engine.

In testimony whereof I have signed my name to this specification.

Dr. FRIEDRICH WILHELM MEYER.